United States Patent
Caidar et al.

(10) Patent No.: US 6,996,344 B1
(45) Date of Patent: Feb. 7, 2006

(54) FIBER OPTIC VIDEO TRANSMITTER AND RECEIVER SYSTEM

(75) Inventors: David Caidar, San Diego, CA (US); Abraham Elmaleh, San Diego, CA (US)

(73) Assignee: Opticomm Corp., San Diego, CA (US)

( * ) Notice: Subject to any disclaimer, the term of this patent is extended or adjusted under 35 U.S.C. 154(b) by 0 days.

(21) Appl. No.: 09/576,484

(22) Filed: May 23, 2000

(51) Int. Cl.
*H04B 10/12* (2006.01)
*H04B 10/00* (2006.01)

(52) U.S. Cl. .................................. 398/141; 398/154
(58) Field of Classification Search ............... 725/129; 359/154, 180, 189, 110; 348/804; 398/154, 398/140, 141
See application file for complete search history.

(56) References Cited

U.S. PATENT DOCUMENTS

| | | | | |
|---|---|---|---|---|
| 3,651,403 A | * | 3/1972 | Fluck, Jr. ................... 725/144 |
| 4,054,794 A | * | 10/1977 | Laughlin et al. ............. 359/132 |
| 4,268,858 A | * | 5/1981 | Wood .......................... 725/74 |
| 4,278,850 A | * | 7/1981 | Sato et al. ................... 359/110 |
| 4,286,112 A | * | 8/1981 | Weiss ........................ 178/23 R |
| 4,949,051 A | * | 8/1990 | Viola ........................... 331/11 |
| 5,016,005 A | * | 5/1991 | Shaw et al. ............. 340/870.19 |
| 5,670,962 A | * | 9/1997 | Henderson et al. ........... 342/70 |
| 5,677,905 A | * | 10/1997 | Bigham et al. ........ 370/395.21 |
| 5,854,840 A | * | 12/1998 | Cannella, Jr. ............... 380/268 |
| 5,898,666 A | * | 4/1999 | Fukuda ....................... 370/280 |
| 6,333,802 B1 | * | 12/2001 | Ogawa et al. ............... 398/141 |
| 6,384,948 B1 | * | 5/2002 | Williams et al. ............ 398/202 |
| 6,418,558 B1 | * | 7/2002 | Roberts et al. ............. 725/129 |
| 6,601,164 B1 | * | 7/2003 | Robertson ....................... 713/1 |
| 2002/0129379 A1 | * | 9/2002 | Levinson et al. ........... 725/129 |

FOREIGN PATENT DOCUMENTS

JP 59127473 A * 7/1984

* cited by examiner

*Primary Examiner*—M. R. Sedighian
*Assistant Examiner*—Shi K. Li
(74) *Attorney, Agent, or Firm*—Donn K. Harms

(57) ABSTRACT

A video transmission system, for sending uncompressed digital video signals from an originating device such as a digital video camera to a distant location, such as a studio or editing facility and for receiving video signals sent from a distant location. The transmitter features an input for receiving an uncompressed digital video signal from a coaxial cable, an equalizer, a reclocker, and a transmitter communicating a reformed signal through a fiber optic line. A receiver system may also be employed for receiving an uncompressed digital video signal from a fiber optic cable and outputting a corresponding electrical signal to a reclocker for communication through a coaxial cable.

15 Claims, 4 Drawing Sheets

FIBER OPTIC VIDEO TRANSMITTER AND RECEIVER SYSTEM

FIELD OF THE INVENTION

This invention relates to transmitters for sending uncompressed digital video signals from an originating device such as a digital video camera to a distant location, such as a studio or editing facility and receivers for receiving signals sent from a distant location.

BACKGROUND OF THE INVENTION

In the past, video cameras or other sources of video imagery produced analog signals that were passed on to monitors, editing stations, post production, etc. via coaxial cables. With the advent of digital video cameras, and other devices transmitting a high quality digital video signal, coaxial cables are often unsatisfactory. Significant signal degradation occurs when the distance between the source and the user of the signal is over 100 meters. Fiber optic systems have been used to transmit a variety of analog and digital signals. Typically, these signals involve a number of technologies, including broadcast quality video cameras, broadcast remote digital video broadcasting systems including drop distribution, post production point-to-point links, studio matrix digital video switching networks, serial digital interface video transport for high definition television, high quality radiology and other medical systems, sports, special events, studio broadcast programming, etc.

Prior digital image transmitting systems have been quite limited and specialized. For example, Lang in U.S. Pat. No. 5,164,839 describes a system for storing compressed digital video source information on magnetic media, then transmitting it to a remote VCR over a fiber optic cable. This system is limited in video rate transmission and degrades signal quality through compression.

Transmitting telephone signals via fiber optics is described by Schussler in U.S. Pat. No. 4,441,180. A multiplexing system for simultaneously transmitting a number of signals over a fiber optic system is described by Bell in U.S. Pat. No. 4,061,577. Kostreski, in U.S. Pat. No. 5,534,912, describes a "video on demand" system which transmits video signals over fiber optics.

Prior systems such as these do not provide the ideal combination of functions that will provide transmission over longer distances without signal degradation and avoiding compression, will comply with requirements of serial digital interface (SDI), digital video broadcasting (DVB) and high definition television (HDTV) systems and provide flexibility in furnishing a variety of data rates with automatic lock-on.

Thus, there is a continuing need for improved fiber optic cable transmitters and receivers for use with uncompressed digital signals from broadcast cameras and the like, which permits transmission up to about 350 meters with automatic cable equalization and a communications link up to about 40 kilometers without significant signal degradation, utilize an uncompressed digital signal for optimum quality, will automatically lock on any of a plurality of data rates, and provide status indicators for power regulation, signal strength, data rate and serial digital interface lock/unlock.

SUMMARY OF THE INVENTION

The above-noted capabilities, and others, are provided in accordance with this invention which, basically, includes a transmitter for receiving a digital video signal from a source, such as a video camera, and transmitting the signal via an optical fiber and a receiver for receiving the signal from the optical fiber and preparing the signal for use in any desired manner, such as broadcast transmission, editing, etc.

The transmitter basically comprises an equalizer which performs automatic gain control and cable matching to 75 ohms coaxial cable that receives an input signal from a source, such as a digital video camera via a standard 75 ohm coaxial cable. The equalized data signal is passed to a reclocker for synchronization, decoding and reclocking to predetermined standard signals. Synchronization, for the purposes of this application comprises stabilizing the clock, retiming data signals, correcting for incoming signal jitter, etc. and otherwise cleaning up the signal. The signal is then passed to a laser transmitter where a digital optical signal is introduced into a fiber optic cable.

Meanwhile, the equalized signal from the equalizer is passed to a signal level detector. A second output signal from the reclocker is passed to the data rate and level encoder, which activates a Circuit Board Indicator (CBI) driver to provide visual indiction of the data rate, signal level and power on or off. A 5v power regulator is included to provide power at that level to the system components.

The receiver basically comprises a laser detector that receives the encoded laser signal from the fiber optic converts it to an electrical signal and transmits the signal to a reclocker for synchronization. The synchronized signal then goes to a 75 ohms Video Driver and then passed through coaxial cable to a monitor or other system that will use the signal. A 5v power regulator is also provided. Meanwhile, a second signal from the reclocker is passed to a data rate and lock encoder and CBI driver which will display a visual indication of operating parameters, including the data rate in use, and power on/off, whether the incoming signal is locked or unlocked.

The transmitter and receiver are each contained in a small module that can be easily secured to operating equipment, such a broadcast digital video camera or editing equipment. Alternatively, a plurality of modules may me mounted in a 19" rack for convenient operation and observation of the operating parameter indicators.

BRIEF DESCRIPTION OF THE DRAWING

Details of the invention, and of preferred embodiments thereof, will be further understood upon reference to the drawing, wherein.

DETAILED DESCRIPTION OF PREFERRED EMBODIMENTS

Figure 1:
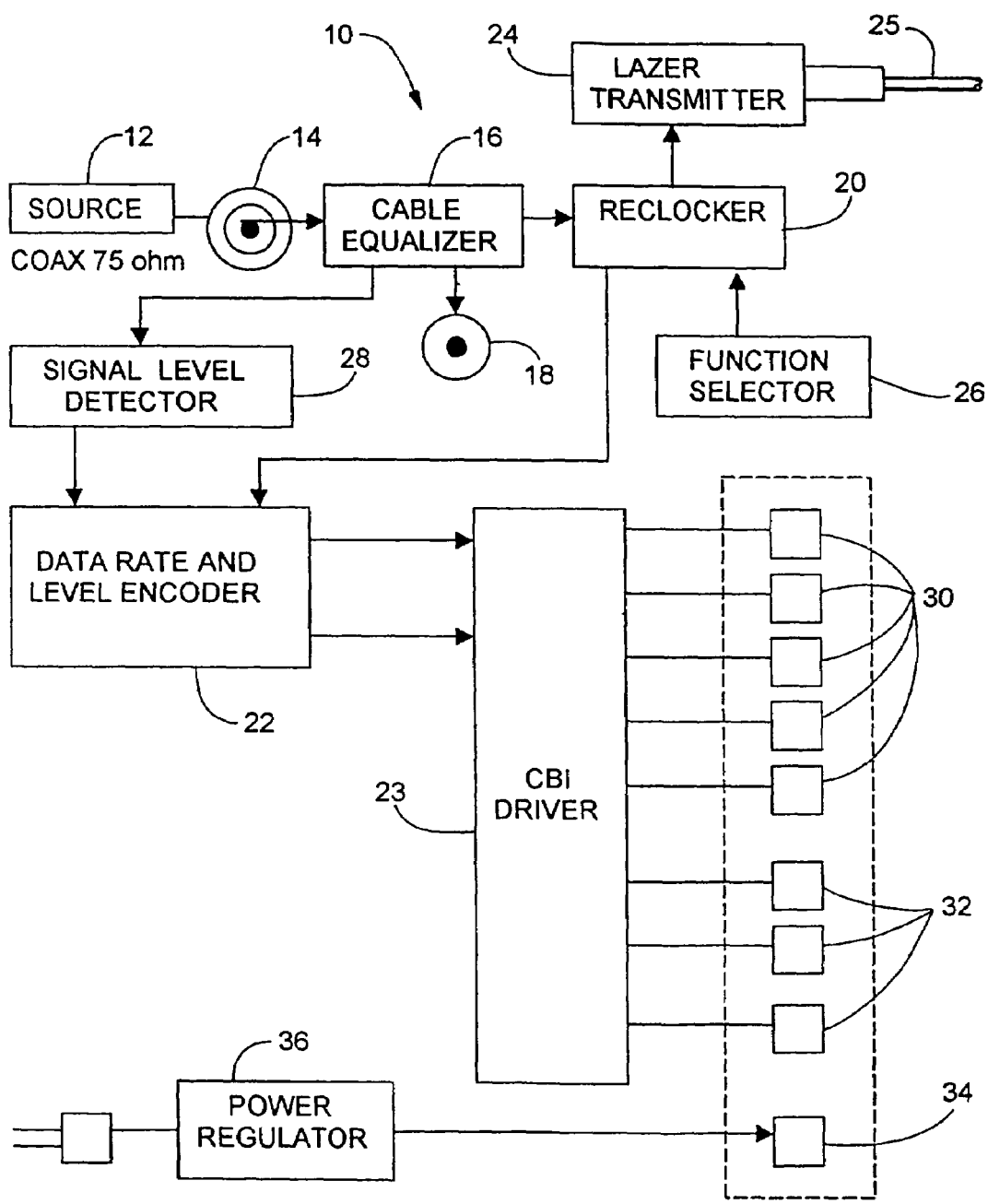
FIG. 1 is a block diagram of the fiber optic video transmitter of this invention.

FIG. 1 is a block diagram of the transmitter 10 for transmitting a video signal through a fiber optic.

A video signal from a source 12 such as a video camera is received via a conventional 75 ohm coaxial cable 14 or the like. That signal is passed to a cable equalizer 16, such as a Genlinx II GS9024 from the Gennum Corporation, Burlington, Ontario, Canada. Cable equalizer 16 is a high performance automatic cable equalizer capable of processing serial digital data rates from 30 to 622 Mb/s. Cable equalizer 16 receives either single-ended or differential serial data and outputs equalized differential signals at Positive Electrical Control Levels (PECL), e.g. 800 mV. Preferably, cable equalizer 16 provides up to 40 dB of gain at 200 MHz, resulting in equalization of greater than 350 m at 270 Mb/s of Belden 8281 cable. The equalizer 16 also produces a signal level indicator.

A conventional test point 18 is preferably provided to allow testing of the eye signal.

The equalized signal from cable equalizer 16 is passed to serial digital reclocker 20, which automatically detects and locks onto the incoming differential signal. Reclocker 20 outputs a synchronized data signal which provides clock and data recovery for eliminating jitter, etc. Also, the laser driver is disabled if no proper clock and data are received.

Reclocker 20 may be operated in a manual mode where a particular data rate is specified or in an automatic mode in which the reclocker automatically cycles through the different SMPTE data rates and locks on to the correct one.

Reclocker 20 also produces a signal which indicates the data rate, which is processed in data rate and level encoder 22, as detailed below.

Figure 3:
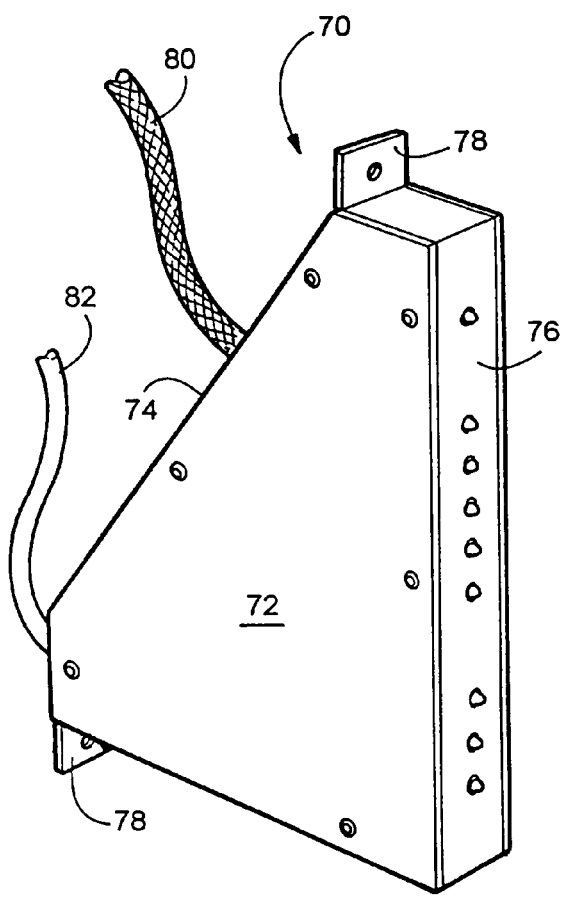
FIG. 3 is a perspective view of the transmitter.

The synchronized signal from reclocker 20 passes to laser transmitter 24 where the electrical signal is converted to a corresponding laser signal and directed into fiber optic cable 25. A conventional automatic power control circuit is included to maintain a constant output power laser signal. While any suitable laser transmitter may be used, the STX-12 from Optical Communication Products, Inc., Chatsworth, Calif. is preferred. Data rate and level encoder 22 receives a signal from reclocker 22, as mentioned above. A signal level detector 26 (typically an ICL7665CSA from the Maxim company) receives a an input signal from cable equalizer 16, detects and analyzes the level of the signal and passes that information on to data rate and level encoder 22, typically an MC1455B available from the Motorola company. Signals corresponding to the data rate and the degree of lock are passed from data rate and level encoder 22 to Circuit Board Indicator driver 23, typically a ULN2001A darlington array which drives a panel having a row of light emitting diodes (as seen in FIG. 3) with indicia adjacent to each LED indicating the meaning of the lighted LED. One of the top five LEDs typically glows green when activated and shows the data rate, e.g. 143, 177, 270, 360 and 540 Mb/s in use.

Three LEDs 32 indicate the signal level. Typically the top LED 32 will show green when the signal level is at the optimum level. The central LED 32 will glow yellow, indicating a marginal, but generally useful, signal level. Bottom LED 32 will glow red to indicate no signal or an unacceptably low signal level.

A final LED 34 will glow green when the system is powered and will be off when power is off.

Figure 2:
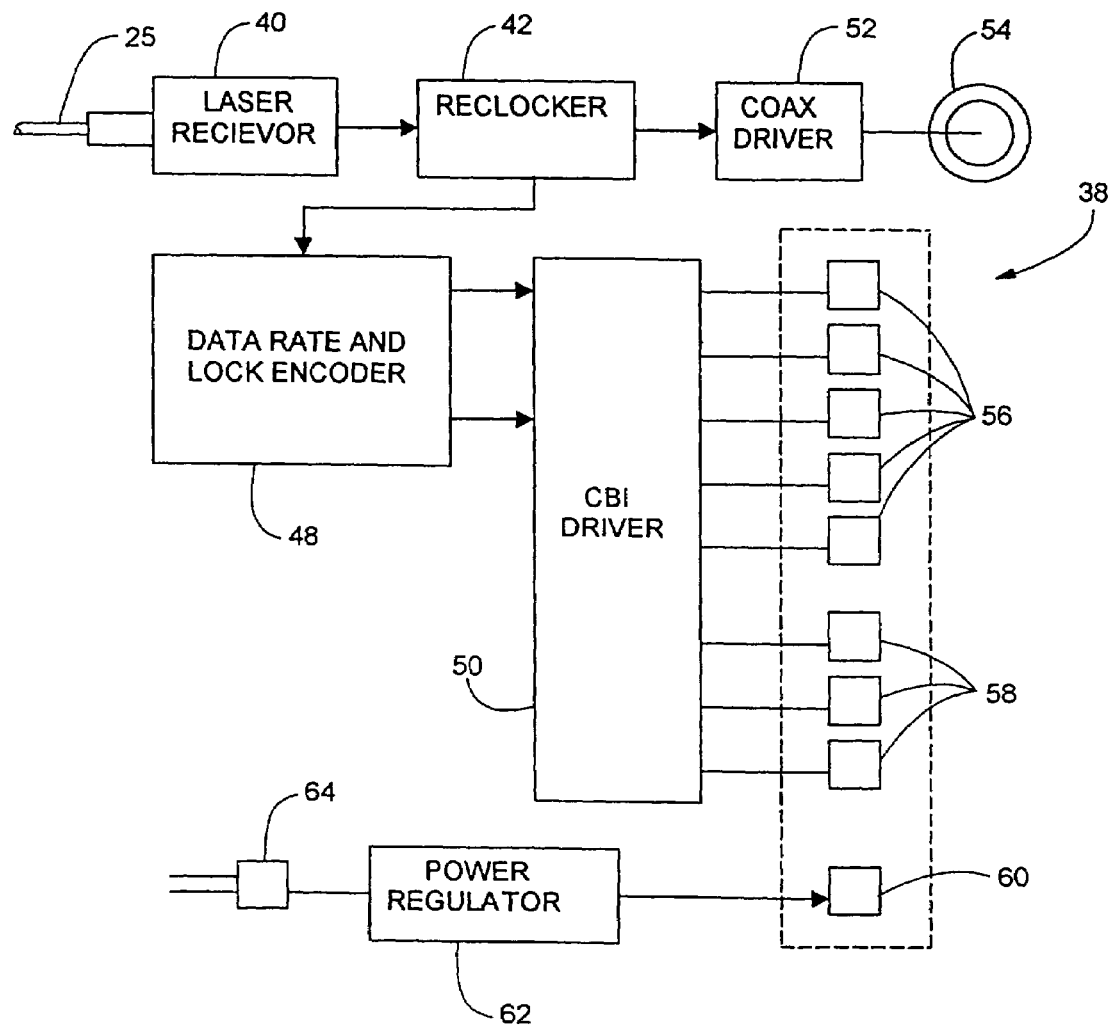
FIG. 2 is a block diagram of the fiber optic video receiver of this invention.

Preferably, the system is voltage power protected and works at 5 volts, as provided by power regulator 36 (typically a L7805CV from the Motorola company) which receives AC/DC power from power supply 38 at a voltage of 9 to 12V through conventional wiring (not shown, for clarity) to the various system components. FIG. 2 is a block diagram of a receiver 38 for receiving information from fiber optic cable 25.

A laser carried signal from transmitter 10 is received at laser receiver 40 via fiber optic cable 25 where an electrical signal corresponding to the incoming signal is created. While any suitable laser receiver may be used, the SRX-12 from Optical Communications Products, Inc. is preferred.

The signal is then passed to reclocker 42, typically a GENLINX II GS9035 from the Gennum corporation. Reclocker 42 includes a function selector that automatically detects and locks onto the incoming data signal. Information relating to the detected data rate and degree of lock are passed onto data rate and lock encoder 48, as described below.

The synchronized data signal from reclocker 42 is passed to a coaxial cable driver 52 (typically a GS9028 from the Gennum Corporation) that is designed to drive at least one 75 ohm co-axial cable 54. The electrical data signal from cable 54 can be directed to any suitable equipment, such as a monitor, editing or post-production equipment, etc. Data rate and lock encoder 48 receives the data rate automatically selected at reclocker 42 and information showing the degree of lock and encodes that information for use by CBI driver 50. Typically, data rate and lock encoder 48 may be an MC14555B decoder/demultiplexer from Motorola.

CBI driver 50 typically includes a plurality of darlington array pairs to drive an LED display. CBI driver 50 may be a ULN2001AD device from SGS-Thomson Microelectronics. A plurality of LEDs are provided to indicate the data rate being used. Typically, five LEDs 56 are provided, each of which indicates one data rate from a typical set including data rates of 143, 177, 270, 360 and 540 Mb/s. Indica alongside each LED indicates which rate is symbolized by that LED. A second series 58 of LEDs indicates lock and unlock. Typically, lock will be indicated by a green LED, and unlock by a red LED.

Figure 4:
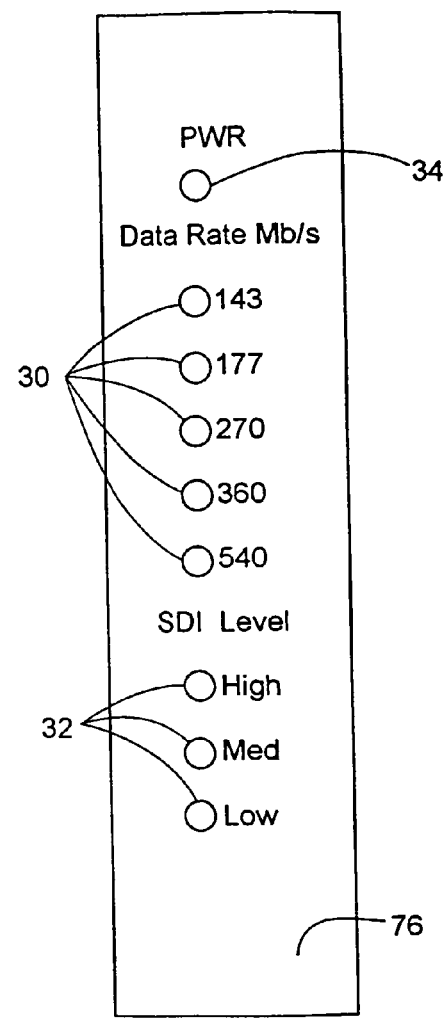
FIG. 4 is an elevation view of the back of the transmitter.

A conventional power supply 62 furnishes 5 volt power to the other components, typically from a 12 volt input 64. A final LED 60, grouped with the other LEDs will indicate power on by, typically, a green LED. Both transmitter 10 and receiver 40 preferably have the same general housing configuration. FIG. 3 shows a perspective view of a housing 70 for a typical transmitter 10 while FIG. 4 shows the back of housing 70. Housing 70 has side walls 72, preferably parallel, a back wall 74, preferably sloping for ease of access, and a front wall 76. Mounting flanges 78 are provided for mounting a plurality of housings 70 side-by-side in a rack. Alternatively, flanges 78 may be secured to a sidewall 72, parallel to the sidewall, for mounting on a professional video camera or the like. A coaxial cable connector 80 and a fiber optic cable connector 82 are provided on back face 74.

On the back surface, as seen in FIG. 4, are located the various informational diodes, including data rate diodes 30, one of which will be lit to show one specific data rate, signal level diodes one of which will be lit to indicate high, medium or low signal level and a power LED 34 to indicate power on. Indica are provided alongside each LED to indicate the parameter being indicated, e.g. data rate numbers, "signal level", "power on", etc.

Figure 5:
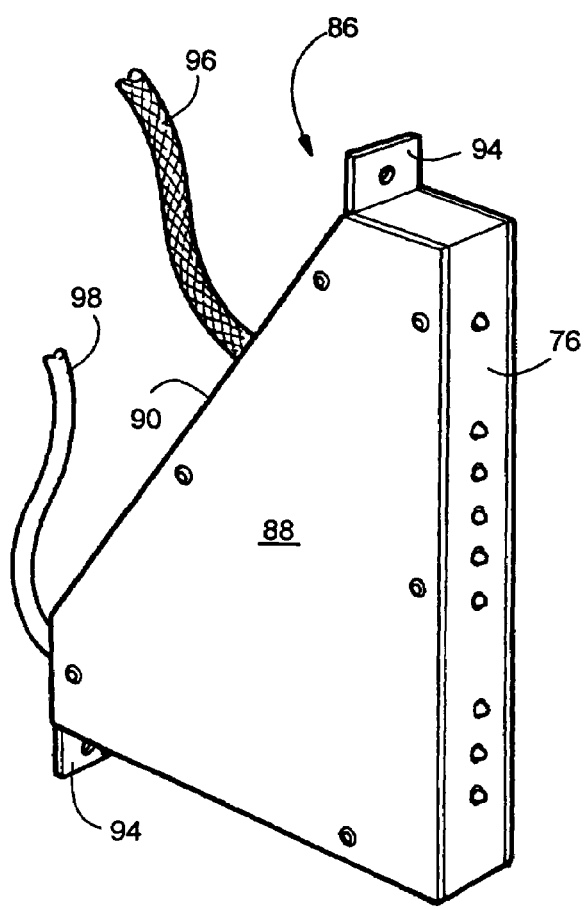
FIG. 5 is a perspective view of the receiver.

FIG. 5 shows a perspective view of a housing 86 for a typical receiver 38 Housing 86 has side walls 88, preferably parallel, a back wall 90, preferably sloping for ease of access, and a back wall 92. Mounting flanges 94 are provided for mounting a plurality of housings 86 side-by-side in a rack. Alternatively, flanges 94 may be secured to a sidewall 88, parallel to the sidewall, for mounting on a professional video camera or the like. A coaxial cable connector 96 is provided for the outgoing electrical signal on back face 90. A fiber optic cable connector 98 is provided for the incoming optical signal.

Figure 6:
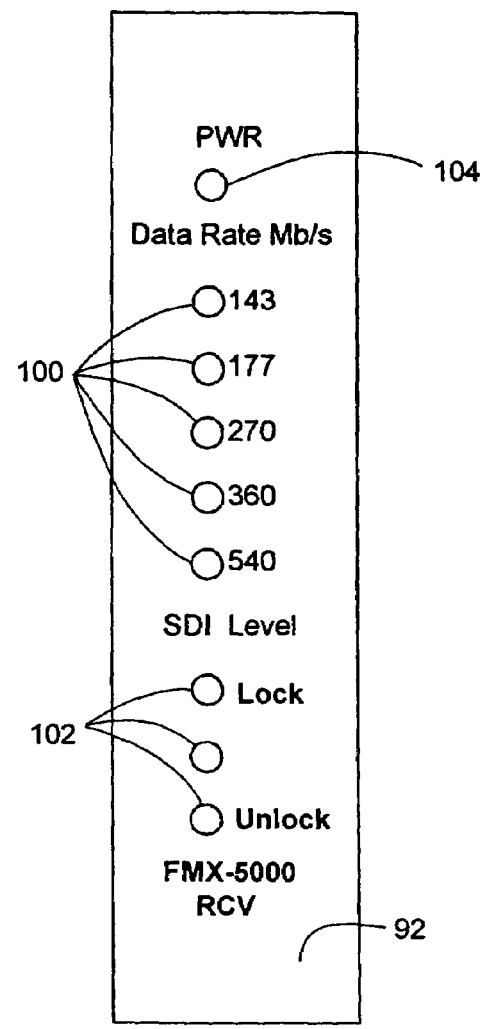
FIG. 6 is an elevation view of the back of the receiver.

On the back surface, as seen in FIG. 6, are located the various informational LEDs, including data rate LED 100, one of which will be lit to show one specific data rate, and lock and unlock diodes 102 one of which will be lit to indicate high lock or unlock and a power LED 104 to indicate power on. Indica are provided alongside each LED to indicate the parameter being indicated, e.g. data rate numbers, "lock", "power on", etc.

Altogether, this is a compact, efficient system which provides access to diagnostic and trouble shooting information through the LED array and test points.

Other applications, variations and ramifications of this invention will occur to those skilled in the art upon reading this disclosure. Those are intended to be included within the scope of this invention, as defined in the appended claims.

What is claimed is:

1. A fiber optic video transmitter system, which comprises:
    input means for receiving an uncompressed digital video signal from a coaxial cable;
    a cable equalizer for receiving and equalizing said digital video signal from said input means and producing an equalized signal;
    a reclocker for receiving and synchronizing said equalized signal to a predetermined standard signal and outputting a first synchronized data signal;
    a laser transmitter means for receiving said first synchronized data signal, and producing a laser beam carrying the resulting data signal;
    means for directing said resulting data signal into a fiber optic cable for transmitting said first synchronized data signal,
    means for directing a second equalized signal from said cable equalizer;
    a level detector for receiving said second equalized signal and detecting signal level;
    means for directing signal level output from said level detector and means for directing a second synchronized data signal from said reclocker to a data rate and level encoder; and
    said data rate and level encoder including means for receiving said detected signal level output and said second synchronized data signal and providing visible indicia showing data rate and signal status.

2. The fiber optic video transmitter system according to claim 1 wherein said visible indicia comprises a plurality of light emitting diodes.

3. The fiber optic video transmitter system according to claim 2 wherein a first set of said light emitting diodes comprises one light emitting diodes corresponding to each system data rate, and further including means for lighting a light emitting diode corresponding to the data rate in use.

4. The fiber optic video transmitter system according to claim 2 wherein a second set of three of said light emitting diodes and further includes means for lighting diodes corresponding to signal level.

5. The fiber optic video transmitter system according to claim 1 further including a power regulator for receiving 12 volt power and directing regulated 5 volt direct current power to other system components and further including visible indicia for indicating that power is on.

6. A fiber optic video receiver system, which comprises:
    input means for receiving an uncompressed digital video signal from a fiber optic cable and outputting a corresponding electrical signal;
    a reclocker for receiving and synchronizing said electrical signal to a predetermined standard signal and outputting a synchronized data signal; and
    coaxial cable driver means for receiving said synchronized data signal and including means for directing said synchronized data signal into at least one coaxial cable;
    means for directing a second synchronized signal from said reclocker;
    a data rate and lock encoder for receiving said second syncronized signal and producing an encoded data rate and lock signal; and
    means for directing said encoded signal from said data rate and lock detector to a driver for producing visible indicia showing data rate and signal status.

7. The fiber optic video receiver system according to claim 6 further including a power regulator for receiving 12 volt power and directing regulated 5 volt direct current power to other components and further including visible indicia for indicating that power is on.

8. The fiber optic video receiver system according to claim 6 wherein said visible indicia comprises a plurality of light emitting diodes.

9. The fiber optic video receiver system according to claim 8 wherein a first set of said light emitting diodes comprises one light emitting diodes corresponding to each system data rate, and further including means for lighting a diode corresponding to the data rate in use.

10. The fiber optic video receiver system according to claim 8 wherein a second set of three of said light emitting diodes and further includes means for lighting diodes corresponding to level of signal lock.

11. A fiber optic video transmitter and receiver system for transmitting video signals over long distances, which comprises:
    a fiber optic video transmitter which comprises:
    input means for receiving an uncompressed digital video signal from a coaxial cable;
    a cable equalizer for receiving and equalizing said uncompressed digital video signal from said input means and producing an equalized signal;
    a reclocker for receiving and synchronizing said equalized signal to a predetermined standard and outputting a first synchronized data signal;
    a laser transmitter means for receiving said first synchronized data signal, and producing a laser beam carrying the resulting data signal; and
    output means for directing said resulting data signal into a fiber optic cable for transmitting said first synchronized data signal; and
    a fiber optic video receiver which comprises:
    input means for receiving a digital video signal from said fiber optic cable and outputting a corresponding electrical signal;
    a reclocker for receiving and synchronizing said electrical signal to a predetermined standard signal and outputting a synchronized data signal; and
    coaxial cable driver means for receiving said synchronized data signal and including means for directing said synchronized data signal into at least one coaxial cable; and
    means for directing a second synchronized signal from said reclocker;
    a data rate and lock encoder for receiving said second equalized signal and producing an encoded data rate and lock signal; and
    means for directing said encoded signal from said data rate and lock detector to a driver for producing visible indica showing data rate and signal status.

12. The fiber optic video transmitter and receiver system for transmitting video signals over long distances according to claim 11 wherein each of said fiber optic video receiver and transmitter further includes a power regulator for receiving 12 volt power and directing regulated 5 volt direct current power to other components and further including visible indicia for indicating that power is on.

13. The fiber optic video transmitter and receiver system for transmitting video signals over long distances according to claim 11 wherein said fiber optic video transmitter system further includes:

means for directing a second equalized signal from said cable equalizer;

a level detector for receiving said second equalized signal and detecting signal level;

means for directing signal level output from said level detector and means for directing a second synchronized data signal from said reclocker to a data rate and level encoder;

said data rate and level encoder including means for receiving said detected signal level output and said second synchronized data signal and providing visible indicia showing data rate and signal status.

14. The fiber optic video transmitter and receiver system for transmitting video signals over long distances according to claim 11 wherein said visible indicia comprises a plurality of light emitting diodes.

15. The fiber optic video transmitter and receiver system for transmitting video signals over long distances according to claim 11 wherein said visible indicia comprises a plurality of light emitting diodes.

* * * * *